United States Patent
Le Blanc et al.

(10) Patent No.: US 11,408,853 B2
(45) Date of Patent: Aug. 9, 2022

(54) DM-SWATH ACQUISITION TO IMPROVE MSMS CONFIDENCE

(71) Applicant: DH TECHNOLOGIES DEVELOPMENT PTE. LTD., Singapore (SG)

(72) Inventors: Yves Le Blanc, Newmarket (CA); Brendon Seale, Toronto (CA)

(73) Assignee: DH Technologies Development Pte. Ltd., Singapore (SG)

( * ) Notice: Subject to any disclaimer, the term of this patent is extended or adjusted under 35 U.S.C. 154(b) by 25 days.

(21) Appl. No.: 16/962,768

(22) PCT Filed: Jan. 8, 2019

(86) PCT No.: PCT/IB2019/050135
§ 371 (c)(1),
(2) Date: Jul. 16, 2020

(87) PCT Pub. No.: WO2019/142068
PCT Pub. Date: Jul. 25, 2019

(65) Prior Publication Data
US 2020/0355647 A1    Nov. 12, 2020

Related U.S. Application Data

(60) Provisional application No. 62/618,283, filed on Jan. 17, 2018.

(51) Int. Cl.
*H01J 49/00* (2006.01)
*G01N 27/62* (2021.01)
(Continued)

(52) U.S. Cl.
CPC ........ *G01N 27/624* (2013.01); *H01J 49/0031* (2013.01); *H01J 49/0045* (2013.01); *H01J 49/40* (2013.01); *H01J 49/4215* (2013.01)

(58) Field of Classification Search
CPC .......................... G01N 27/624; H01J 49/0031; H01J 49/0045; H01J 49/40; H01J 49/4215; H01J 49/004
(Continued)

(56) References Cited

U.S. PATENT DOCUMENTS 8,809,770 B2 * 8/2014 Bonner .............. G01N 30/7233
                                                                      250/281
9,196,468 B2 * 11/2015 Campbell ........... H01J 49/0081
(Continued)

FOREIGN PATENT DOCUMENTS

JP        2008-530748 A    8/2008

OTHER PUBLICATIONS

International Search Report and Written Opinion for PCT/IB2019/050135, dated May 10, 2019.

*Primary Examiner* — Wyatt A Stoffa
(74) *Attorney, Agent, or Firm* — Kasha Law LLC; John R. Kasha; Kelly L. Kasha

(57) ABSTRACT

In DM-SWATH a plurality of CoVs and a precursor ion mass range are received. A processor performs an iterative series of steps for each CoV of the plurality of CoVs. For each CoV of the plurality of CoVs, the CoV is applied to the DMS device to select a group of precursor ions. A mass filter is instructed to select precursor ions of the group that are within the precursor ion mass range, producing a subgroup of precursor ions. A fragmentation device is instructed to fragment the subgroup of precursor ions, producing a group of product ions. A mass analyzer is instructed to measure the intensity and m/z of the group of product ions, producing a product ion spectrum for each CoV of the plurality of CoVs. DM-SWATH is further used to validate if a known compound is in a sample.

15 Claims, 13 Drawing Sheets

(51) Int. Cl.
  *G01N 27/624* (2021.01)
  *H01J 49/40* (2006.01)
  *H01J 49/42* (2006.01)
(58) Field of Classification Search
  USPC .......................................................... 250/282
  See application file for complete search history.

(56) References Cited

U.S. PATENT DOCUMENTS

| | | | |
|---|---|---|---|
| 9,343,276 B2* | 5/2016 | Tate | H01J 49/004 |
| 9,343,282 B2* | 5/2016 | Tate | G16C 20/20 |
| 9,842,729 B2* | 12/2017 | Tate | G16C 20/20 |
| 9,970,900 B2* | 5/2018 | Kreppenhofer | G01N 33/03 |
| 10,204,770 B2* | 2/2019 | Jarvis | H01J 49/0027 |
| 11,069,517 B2* | 7/2021 | Tate | H01J 49/0045 |
| 2006/0289745 A1 | 12/2006 | Miller et al. | |
| 2012/0056085 A1 | 3/2012 | Giles et al. | |
| 2012/0280120 A1 | 11/2012 | Schneider et al. | |
| 2013/0092834 A1 | 4/2013 | Covey et al. | |
| 2015/0025813 A1* | 1/2015 | Collings | H01J 49/004 250/282 |
| 2016/0109424 A1* | 4/2016 | Johansen | G01N 33/15 506/18 |
| 2017/0248548 A1* | 8/2017 | Campbell | H01J 49/004 |
| 2020/0355647 A1* | 11/2020 | Le Blanc | H01J 49/0045 |

* cited by examiner

DM-SWATH ACQUISITION TO IMPROVE MSMS CONFIDENCE

CROSS REFERENCE TO RELATED APPLICATIONS

This application claims the benefit of U.S. Provisional Patent Application Ser. No. 62/618,283, filed Jan. 17, 2018. the content of which is incorporated by reference herein in its entirety.

INTRODUCTION

The teachings herein relate to operating a differential mobility spectrometry (DMS) device and a tandem mass spectrometer in order to discriminate compounds or peptides with similar mass and minor differences in retention time behavior. More particularly, the teachings herein relate to systems and methods for sequentially acquiring product ions of a wide mass range of precursor ions as the differential mobility of the precursor ions is sequentially increased. The differential mobility of the precursor ions is step-wise increased by sequentially stepping the compensation voltage (CoV) of a DMS device. At each step, the same single wide precursor ion mass range is selected and fragmented by a tandem mass spectrometer producing a product ion spectrum.

In conventional sequential windowed acquisition tandem mass spectrometry (SWATH-MS), each product ion spectrum is acquired sequentially with a sequential increase in the precursor ion mass selection window across the precursor ion mass range. Because each product ion spectrum is acquired sequentially with a sequential increase in differential mobility (DM) in the systems and methods described herein, this new type of acquisition can be referred to as DM-SWATH acquisition.

The systems and methods disclosed herein can also be performed using an additional and preceding sample separation device such as, but not limited to, a liquid chromatography (LC) device. The systems and methods disclosed herein are also performed in conjunction with a processor, controller, microcontroller, or computer system, such as the computer system of FIG. 1.

Biologic Characterization

In conventional biologic characterization, users aim to obtain as much sequence coverage via mass spectrometry (MS) only (e.g., time-of-flight mass spectrometry (TOF-MS)) with validation of identified peptides by tandem mass spectrometry, or mass spectrometry/mass spectrometry MS/MS, (sequence linked to product ions). For the MS/MS validation, a user typically relies on information dependent analysis (IDA) MS/MS data collection (i.e., automated precursor selection for MS/MS with precursor selection at 1 amu) or sequential windowed (SWATH) analysis. The percentage of validated peptides in MS/MS mode varies between both approaches, with IDA being the lowest (typical 50-65%) and SWATH being the highest (typically 75-85%). The gain offered by SWATH relies on the non-stochastic sampling of the precursor ions that can be linked to MS/MS sequence information.

Conventional SWATH can segregate product ions by segmenting precursor ion filtering (e.g. in a first quadrupole (Q1)) into wide windows, thus ensuring that individual charge states associated with a given peptide are fragmented individually and retention times (e.g., of a liquid chromatography (LC) separation) play a key role in providing additional segregation. Therefore, peptides with similar mass and minor differences in retention behavior (co-elution) may not be discriminated. As a result, additional systems and methods are needed to discriminate peptides with similar mass and minor differences in retention time behavior.

Background on Mass Spectrometry Techniques

Mass spectrometers are often coupled with chromatography or other separation systems in order to identify and characterize eluting known compounds of interest from a sample. In such a coupled system, the eluting solvent is ionized and a series of mass spectra are obtained from the eluting solvent at specified time intervals called retention times. These retention times range from, for example, 1 second to 100 minutes or greater. The series of mass spectra form a chromatogram, or extracted ion chromatogram (XIC).

Peaks found in the XIC are used to identify or characterize a known peptide or compound in the sample. More particularly, the retention times of peaks and/or the area of peaks are used to identify or characterize (quantify) a known peptide or compound in the sample.

In traditional separation coupled mass spectrometry systems, a fragment or product ion of a known compound is selected for analysis. A tandem mass spectrometry or mass spectrometry/mass spectrometry (MS/MS) scan is then performed at each interval of the separation for a mass range that includes the product ion. The intensity of the product ion found in each MS/MS scan is collected over time and analyzed as a collection of spectra, or an XIC, for example.

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined for a compound of interest. As a sample is being introduced into the tandem mass spectrometer, the one or more transitions are interrogated or monitored during each time period or cycle of a plurality of time periods or cycles. In other words, the mass spectrometer selects and fragments the precursor ion of each transition and performs a targeted mass analysis only for the product ion of the transition. As a result, an intensity (a product ion intensity) is produced for each transition. Targeted acquisition methods include, but are not limited to, multiple reaction monitoring (MRM) and selected reaction monitoring (SRM).

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be very narrow so that the likelihood of multiple precursors within the window is small. This type of DIA method is called, for example, MS/MS$^{ALL}$. In an MS/MS$^{ALL}$ method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, is not practical for some instruments and experiments.

As a result, a larger precursor ion mass selection window, or selection window with a greater width, is stepped across the entire precursor mass range. This type of DIA method is called, for example, SWATH acquisition. In a SWATH acquisition, the precursor ion mass selection window stepped across the precursor mass range in each cycle may have a width of 5-25 amu, or even larger. Like the MS/MS$^{ALL}$ method, all the precursor ions in each precursor ion mass selection window are fragmented, and all of the product ions of all of the precursor ions in each mass selection window are mass analyzed.

U.S. Pat. No. 8,809,770 describes how SWATH acquisition can be used to provide quantitative and qualitative information about the precursor ions of compounds of interest. In particular, the product ions found from fragmenting a precursor ion mass selection window are compared to a database of known product ions of compounds of interest. In addition, ion traces or XICs of the product ions found from fragmenting a precursor ion mass selection window are analyzed to provide quantitative and qualitative information.

FIG. 2 is an exemplary diagram 200 of a precursor ion mass-to-charge ratio (m/z) range that is divided into ten precursor ion mass selection windows for a data independent acquisition (DIA) SWATH workflow. The m/z range shown in FIG. 2 is 200 m/z. Note that the terms "mass" and "m/z" are used interchangeably herein. Generally, mass spectrometry measurements are made in m/z and converted to mass by multiplying by charge.

Each of the ten precursor ion mass selection or isolation windows spans or has a width of 20 m/z. Three of the ten precursor ion mass selection windows, windows 201, 202, and 210, are shown in FIG. 2. Precursor ion mass selection windows 201, 202, and 210 are shown as non-overlapping windows with the same width. Precursor ion mass selection windows can also overlap and/or can have variable widths.

FIG. 2 depicts non-variable and non-overlapping precursor ion mass selection windows used in a single cycle of an exemplary SWATH acquisition. A tandem mass spectrometer that can perform a SWATH acquisition method can further be coupled with a sample introduction device that separates one or more compounds from the sample over time, for example. A sample introduction device can introduce a sample to the tandem mass spectrometer using a technique that includes, but is not limited to, injection, liquid chromatography, gas chromatography, or capillary electrophoresis. The separated one or more compounds are ionized by an ion source, producing an ion beam of precursor ions of the one or more compounds that are selected and fragmented by the tandem mass spectrometer.

As a result, for each time step of a sample introduction of separated compounds, each of the ten precursor ion mass selection windows is selected and then fragmented, producing ten product ion spectra for the entire m/z range. In other words, each of the ten precursor ion mass selection windows is selected and then fragmented during each cycle of a plurality of cycles.

FIG. 3 is an exemplary diagram 300 that graphically depicts the steps for obtaining product ion traces or XICs from each precursor ion mass selection window during each cycle of a DIA workflow. For example, ten precursor ion mass selection windows, represented by precursor ion mass selection windows 201, 202, and 210 in FIG. 3, are selected and fragmented during each cycle of a total of 1000 cycles.

During each cycle, a product ion spectrum is obtained for each precursor ion mass selection window. For example, product ion spectrum 311 is obtained by fragmenting precursor ion mass selection window 201 during cycle 1, product ion spectrum 312 is obtained by fragmenting precursor ion mass selection window 201 during cycle 2, and product ion spectrum 313 is obtained by fragmenting precursor ion mass selection window 201 during cycle 1000.

By plotting the intensities of the product ions in each product ion spectrum of each precursor ion mass selection window over time, XICs can be calculated for each product ion produced from each precursor ion mass selection window. For example, plot 320 includes the XICs calculated for each product ion of the 1000 product ion spectra of precursor ion mass selection window 201. Note that XICs can be plotted in terms of time or cycles.

The XICs in plot 320 are shown plotted in two dimensions in FIG. 3. However, each XIC is actually three-dimensional, because the different XICs are calculated for different m/z values.

FIG. 4 is an exemplary diagram 400 that shows the three-dimensionality of product ion XICs obtained for a precursor ion mass selection window over time. In FIG. 4, the x axis is time or cycle number, they axis is product ion intensity, and the z axis is m/z. From this three-dimensional plot, more information is obtained. For example, XIC peaks 410 and 420 both have the same shape and occur at the same time, or same retention time. However, XIC peaks 410 and 420 have different m/z values. This may mean that XIC peaks 410 and 420 are isotopic peaks or represent different product ions from the same precursor ion. Similarly, XIC peaks 430 and 440 have the same m/z value but occur at different times. This may mean that XIC peaks 430 and 440 are the same product ion, but they are from two different precursor ions.

FIGS. 2-4 show how mass and retention time can be used to characterize compounds such as peptides using SWATH. However, as described above, additional systems and methods are needed to discriminate compounds or peptides with similar mass and minor differences in retention time behavior.

Background on Differential Mobility Spectrometry (DMS)

FIG. 5 is a schematic diagram 500 of an exemplary DMS device. DMS device 500 includes two parallel flat plates, plate 510 and plate 520. Radio frequency (RF) voltage source 530 applies an RF separation voltage (SV) across plate 510 and plate 520, and direct current (DC) voltage source 540 applies a DC compensation voltage (CoV) across plate 510 and plate 520. Ions 550 enter DMS device 500 in a transport gas at opening 560. The separation of ions 550 in DMS device 500 is based upon differences in their migration rates under high versus low electric fields.

Unlike traditional ion mobility, ions 550 are not separated in time as they traverse the device. Instead, ions 550 are separated in trajectory based on the difference in their mobility between the high field and low field portions of applied RF voltage source 530. The high field is applied between plate 510 and plate 520 for a short period of time, and then a low field is applied in the opposite direction for a longer period of time. Any difference between the low-field and high-field mobility of an ion of a compound of interest causes it to migrate towards one of the plates. The ion is steered back towards the center-line of the device by the application of a second voltage offset, known as the CoV of DC voltage source 540, a compound-specific parameter that can be used to selectively filter out all other ions. Rapid switching of the CoV allows the user to concurrently monitor many different compounds. Ions 570 selected by the combination of SV and CoV, leave DMS device 500 through opening 580 to the remainder of the mass spectrometer (not shown). DMS device 500 is located between an ion source (not shown) and the remainder of the mass spectrometer, for example.

In general, DMS device 500 has two modes of operation. In the first mode, DMS device 500 is on, SV and CoV voltages are applied, and ions are separated. This is, for example, the enabled mode.

In the second mode of operation, DMS device 500 is off, the SV is set to zero and ions 550 are simply transported from opening 560 to opening 580. This is, for example, the disabled or transparent mode of DMS device 500.

In the enabled mode, DMS device 500 can acquire data for a single MRM transition in 25 milliseconds (ms), for example, including an inter-scan pause time of 20 ms. In transparent mode, the delay through DMS device 500 is negligible.

Background on DMS Acquisition

In both targeted acquisition methods, IDA methods, and DIA methods differential mobility spectrometry (DMS) has been used to discriminate compounds or peptides with similar mass and minor differences in retention time behavior.

MRM is a targeted acquisition method. U.S. Pat. No. 9,733,214 (the "'214 patent") is directed to a method of predicting DMS device parameters for a compound when developing an MRM experiment. When developing an MRM experiment, a large range of DMS device parameter values must be interrogated for each compound or analyte, reducing the number of compounds or analytes that can be tested per injection. In order to address this problem, the '214 patent employs a unique method of MRM triggered MRM. MRM triggered MRM is described, for example, in U.S. Pat. No. 8,026,479. In the '214 patent, original or primary MRM transitions are set with wide steps in DMS device parameters, such as CoV voltage steps, and secondary MRM transitions are triggered with finer steps in DMS parameters.

FIG. 6 is an exemplary diagram 600 showing the MRM triggered MRM method of stepping DMS device parameters as described in the '214 patent. In this method, a primary precursor ion to product ion transition 611 is interrogated at multiple cycles of a liquid chromatography (LC) experiment, for example. For primary transition 611, the DMS device is given $CoV_0$. The intensity of the product ion of primary transition 611 is monitored to determine if it exceeds a threshold T. As shown in diagram 600, in cycle 3 the intensity of the product ion of primary transition 611 exceeds the threshold T.

As a result, a series of secondary MRM transitions is triggered. For each of these secondary MRM transitions, the CoV parameter of the DMS device is increased in small steps in order to determine the best CoV parameter of the DMS device for that transition. For example, for secondary transition 621, the CoV parameter of the DMS device is set to $CoV_1$. Similarly, for secondary transition 622, the CoV parameter of the DMS device is set to $CoV_2$. This stepping of the CoV parameter of the DMS device can continue for as many times the CoV parameter of the DMS device can be changed within one cycle of the LC separation.

Note that primary transition 611 and secondary transitions 621 and 622 all represent the transition of the same precursor ion to the same product ion. The only difference among these transitions is the CoV parameter of the DMS device.

U.S. patent application Ser. No. 15/516,387 (the "'387 application") is directed to improving both IDA and DIA methods by performing a precursor ion survey scan in which DMS device parameters are varied over time. For example, at a plurality of CoV intervals, the m/z intensities of the precursor ions transmitted by the DMS device are measured across an m/z range using a mass analyzer. The result is a snapshot of the distribution of precursor ions in a CoV-space. Given that there are relationships between the m/z of a precursor ion and its optimal CoV for DMS transmission, a workflow can automatically be optimized to include precursor ions from a subset of m/z values present at discrete CoV values.

FIG. 7 is an exemplary diagram 700 showing a precursor ion survey scan in which DMS device parameters are varied over time as described in the '387 application. Over time, the CoV parameter of the DMS device is varied from $CoV_1$ to $CoV_n$. At each CoV parameter value, the same wide precursor ion mass range is selected and analyzed. Note that at each CoV parameter value the precursor ion mass range is mass analyzed, so no precursor ions are fragmented. The result is a series of precursor ion mass spectra 710 through 71n.

The '387 application then collects the precursor ion mass spectra 710 through 71n into a heat map that depicts precursor ion intensities as a function of mass-to-charge ratio (m/z) and CoV. The heat map is used to determine m/z subranges and CoV values for IDA and DIA method analysis. Full tandem mass spectrometry is then performed on these m/z subranges using IDA and DIA method analysis.

Although the methods of the '214 patent and the '387 application have used the discriminating capability of DMS for method development in targeted, IDA, and DIA acquisition methods, additional systems and methods are needed to specifically and directly discriminate compounds or peptides with similar mass and minor differences in retention time behavior. In other words, the techniques described in the '214 patent and the '387 application do not enable wide coverage of CoV values for detecting peptides on and LC-time scale.

SUMMARY

A system, method, and computer program product are disclosed for controlling a differential mobility spectrometry (DMS) device and a tandem mass spectrometer to sequentially select separate groups of precursor ions with different differential mobilities and to mass filter, fragment, and mass analyze the resulting product ions of each group. All three embodiments include the following steps.

A processor receives a plurality of compensation voltages (CoVs) for a DMS device and a precursor ion mass range for a mass filter of a tandem mass spectrometer is received. The DMS device is configured to separate precursor ions based on a CoV. The tandem mass spectrometer receives the separated precursor ions from the DMS device and includes the mass filter and a fragmentation device to filter and fragment precursor ions and a mass analyzer to mass analyze resulting product ions.

The processor performs an iterative series of steps for each CoV of the plurality of CoVs. The CoV is applied to the DMS device to select a group of precursor ions. The mass filter is instructed to select precursor ions of the group that are within the precursor ion mass range, producing a subgroup of precursor ions. The fragmentation device is instructed to fragment the subgroup of precursor ions, producing a group of product ions. The mass analyzer is instructed to measure the intensity and m/z of the group of product ions, producing a product ion spectrum for each CoV of the plurality of CoVs.

Further, the steps of these three embodiments are used to validate if a known compound is in a sample. A sample separation device separates one or more compounds from a sample over time. An ion source ionizes the separated one or more compounds and transmits the ionized precursor ions to the DMS device as an ion beam.

The processor instructs the DMS device to sample the ion beam in a series of time cycles. For each cycle of the series, the processor performs a number of steps. In a first step, the processor instructs the DMS device and the tandem mass spectrometer to perform a precursor survey scan without differential mobility selection, producing a precursor ion spectrum. In a second step, the processor instructs the DMS device and the tandem mass spectrometer to perform sequential differential mobility dependent product ion scans on the ion beam for each CoV of the plurality of CoVs as described above.

The processor validates the presence of a compound of the one or more compounds in the sample using the precursor ion spectra and the product ion spectra measured over the series of time cycles. Specifically, the processor calculates a precursor ion extract ion chromatogram (XIC) for a precursor ion known to correspond to the compound from the precursor ion spectra acquired over the series of time cycles. The processor calculates one or more product ion XICs for one or more product ions known to correspond to the compound from the product ion spectra acquired for each CoV over the series of time cycles. The processor validates the presence of the compound if a retention time of an XIC peak of the precursor ion XIC matches a retention time of an XIC peak of the one or more product ion XICs.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
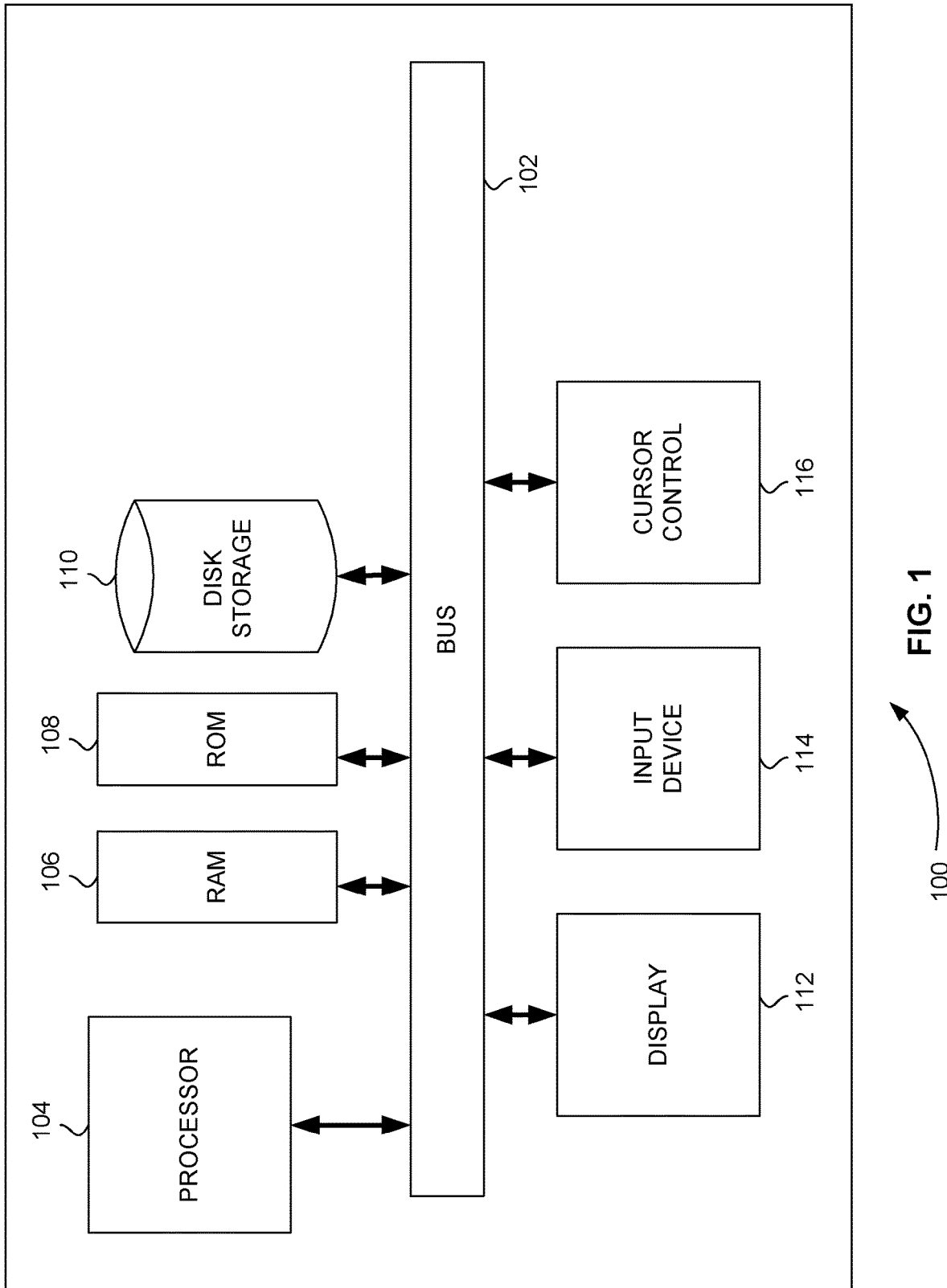
FIG. 1 is a block diagram that illustrates a computer system, upon which embodiments of the present teachings may be implemented.
Figure 2:
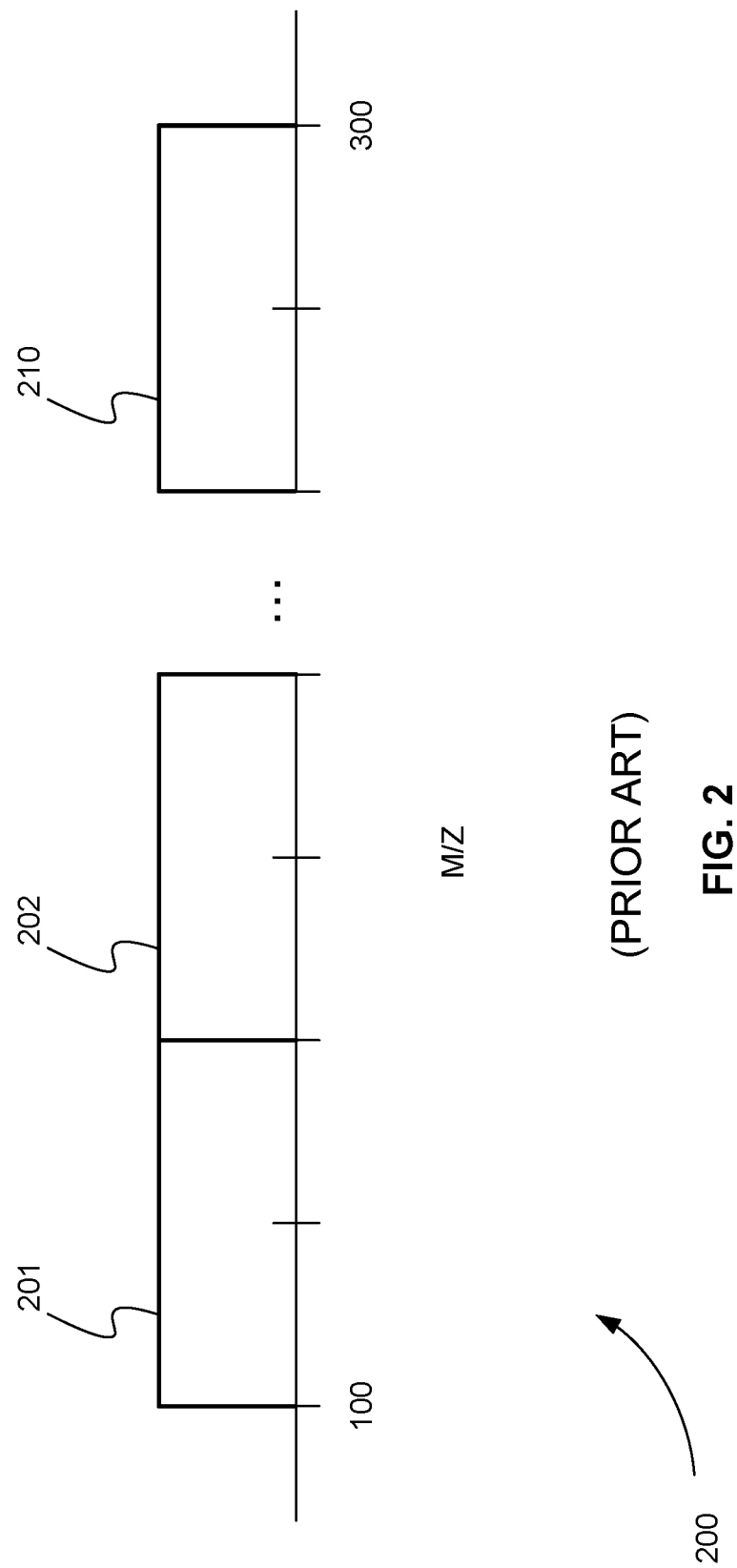
FIG. 2 is an exemplary diagram of a precursor ion mass-to-charge ratio (m/z) range that is divided into ten precursor ion mass selection windows for a data independent acquisition (DIA) SWATH workflow.
Figure 3:
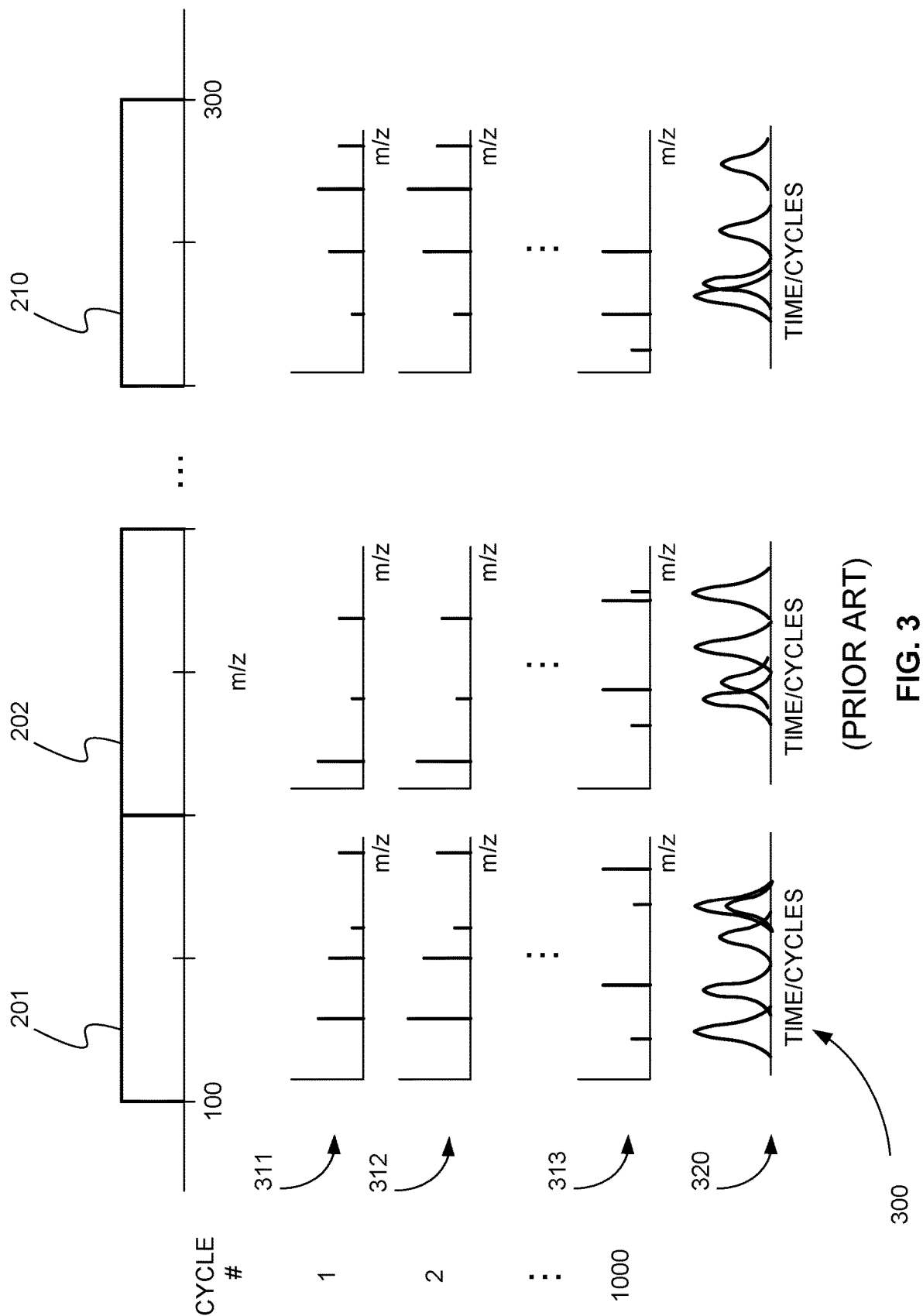
FIG. 3 is an exemplary diagram that graphically depicts the steps for obtaining product ion traces or extracted ion chromatograms (XICs) from each precursor ion mass selection window during each cycle of a DIA workflow.
Figure 4:
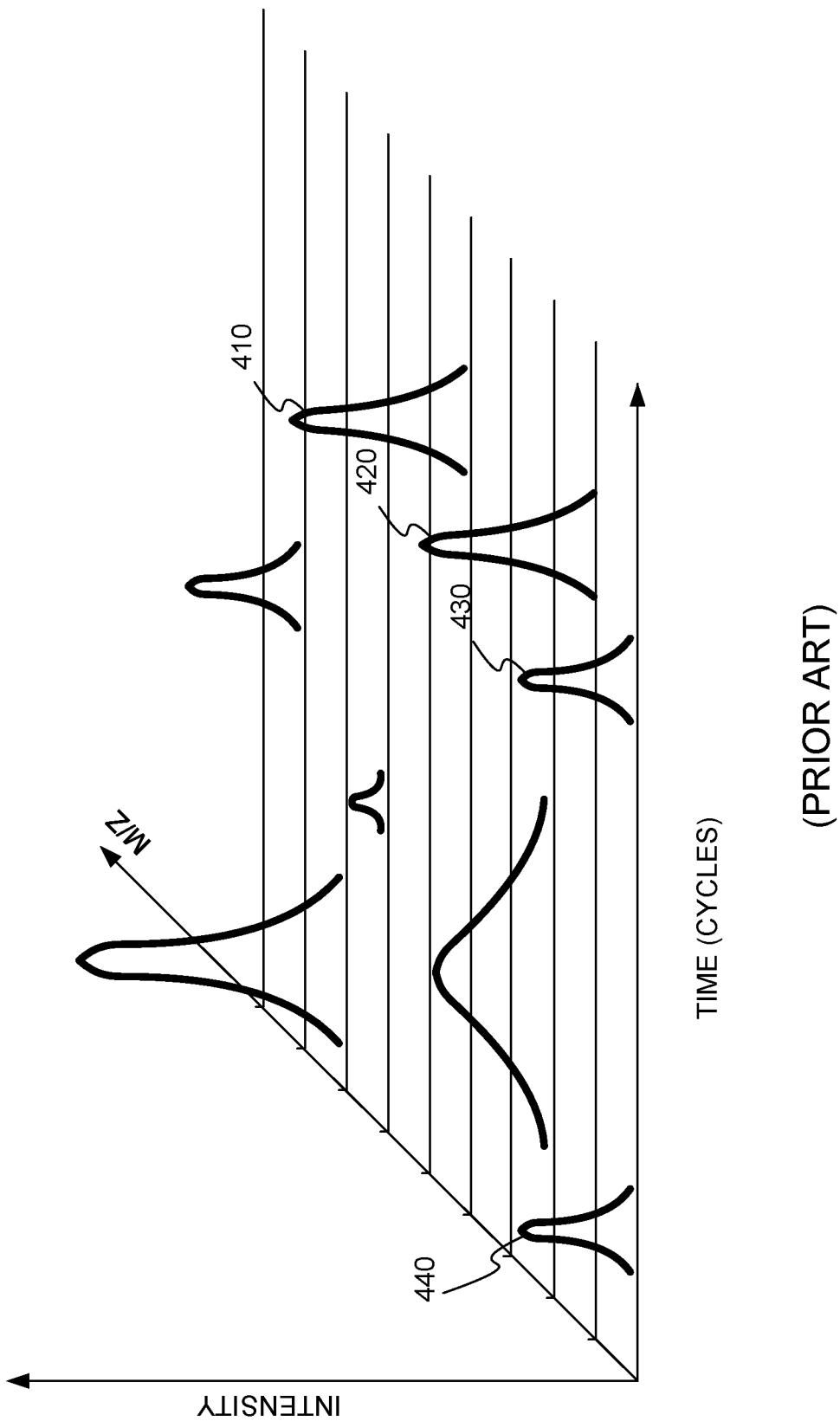
FIG. 4 is an exemplary diagram that shows the three-dimensionality of product ion XICs obtained for a precursor ion mass selection window over time.
Figure 5:
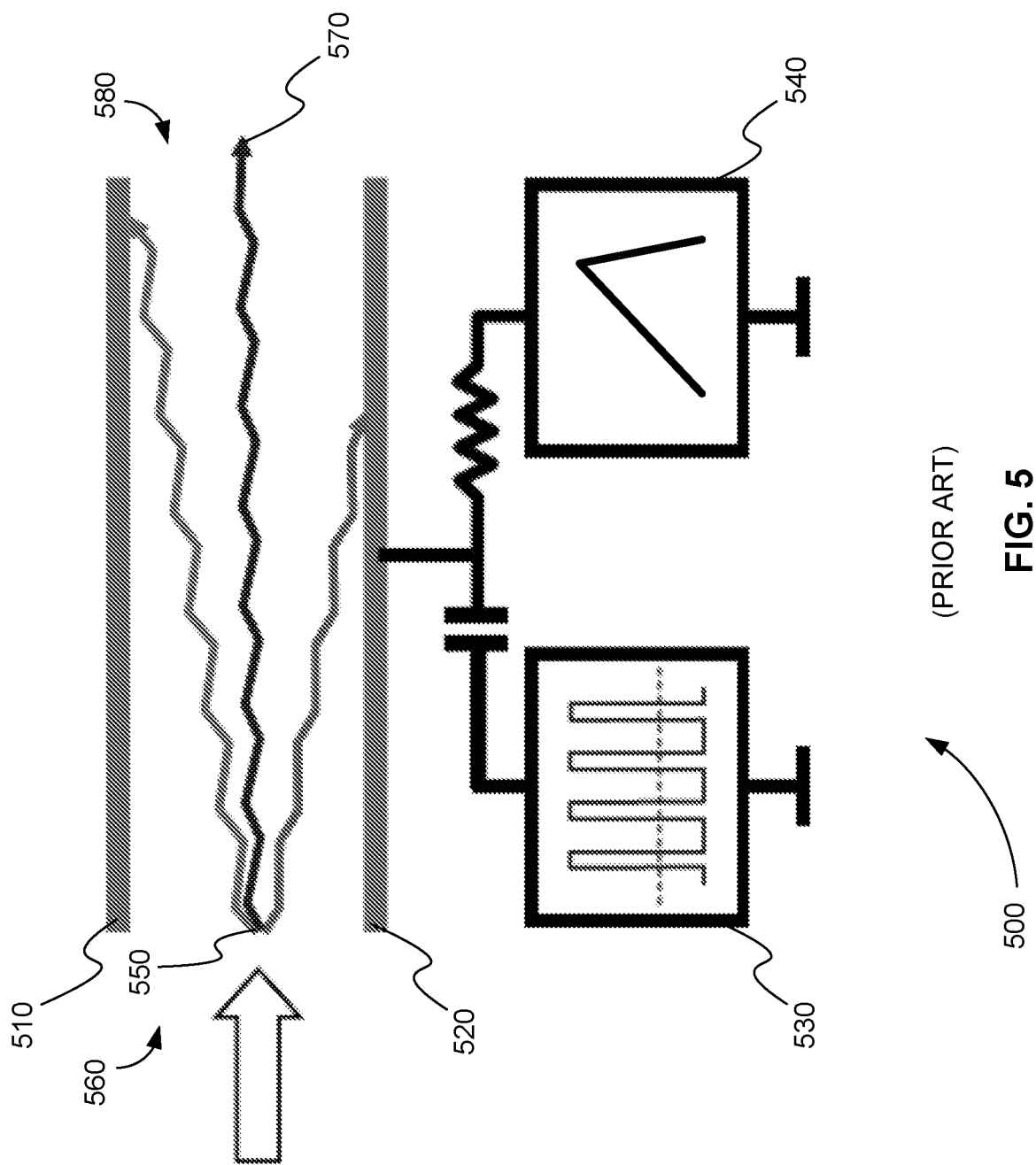
FIG. 5 is a schematic diagram of an exemplary differential mobility spectrometry (DMS) device.
Figure 6:
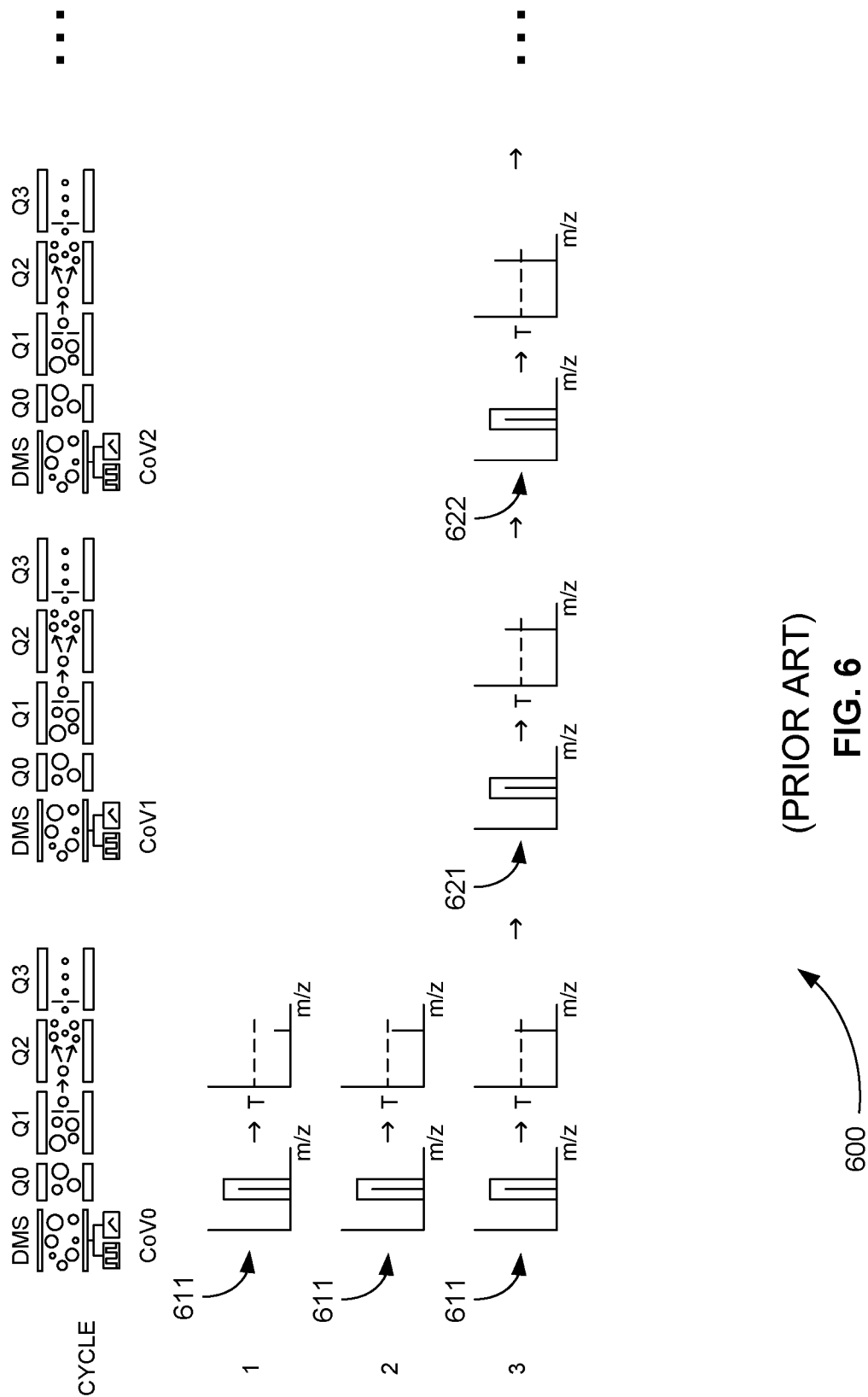
FIG. 6 is an exemplary diagram showing the MRM triggered MRM method of stepping DMS device parameters as described in the '214 patent.
Figure 7:
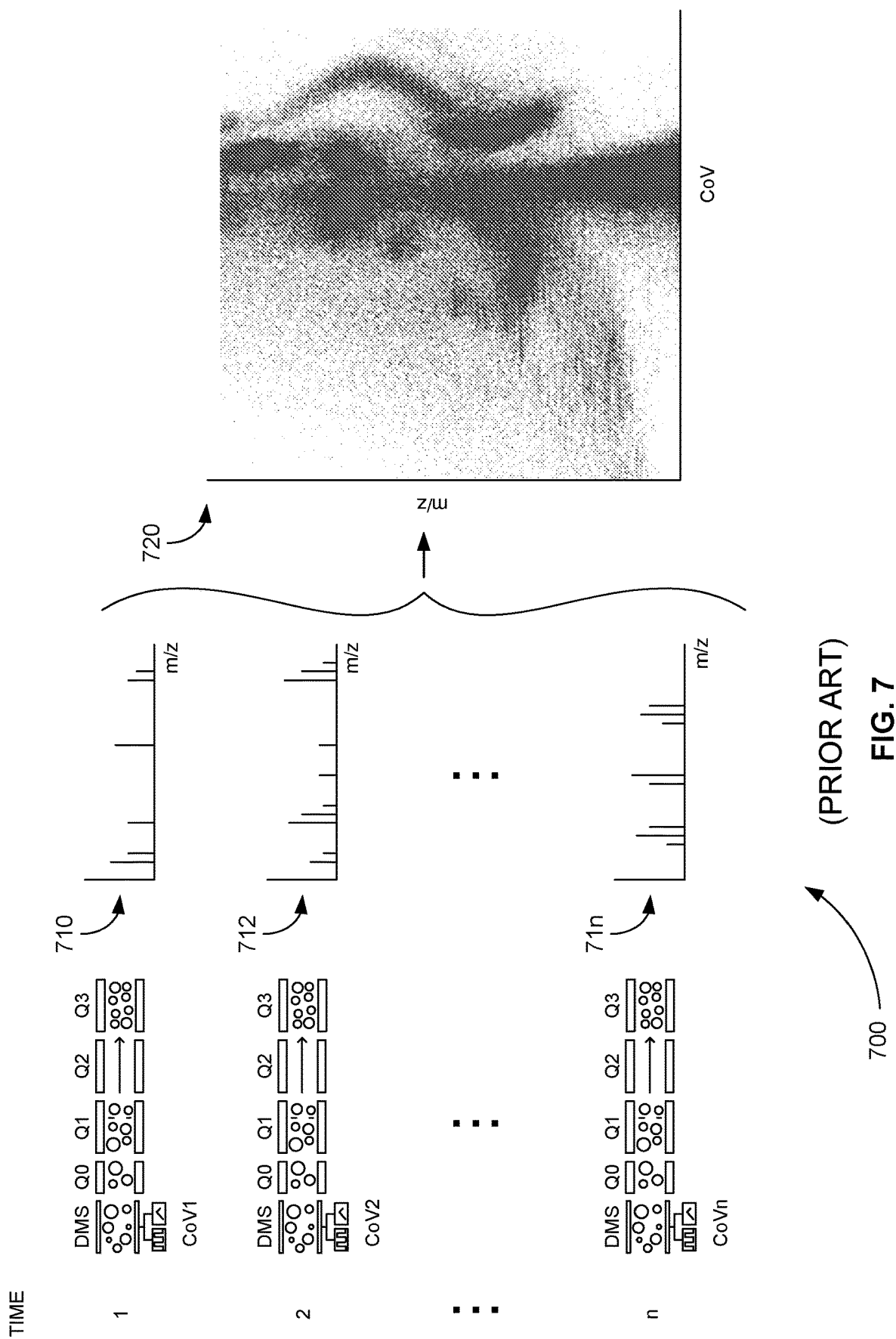
FIG. 7 is an exemplary diagram showing a precursor ion survey scan in which DMS device parameters are varied over time as described in the '387 application.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Systems and Methods for DM-SWATH

As described above, in conventional biologic characterization, users aim to obtain as much sequence coverage via mass spectrometry (MS) only (e.g., time-of-flight mass spectrometry (TOF-MS)) with validation of identified peptides by tandem mass spectrometry, or mass spectrometry/ mass spectrometry MS/MS, (sequence linked to fragment ions). Conventional sequential windowed acquisition tandem mass spectrometry (SWATH-MS) can segregate product ions by segmenting precursor ion filtering (e.g., in a first quadrupole (Q1)) into wide windows, thus ensuring that individual charge states associated with a given peptide are fragmented individually and retention times (e.g., of a liquid chromatography (LC) separation) play a key role in providing additional segregation. Therefore, peptides with similar mass and minor differences in retention behavior (co-elution) may not be discriminated. As a result, additional systems and methods are needed to discriminate peptides with similar mass and minor differences in retention time behavior.

In various embodiments, systems and methods are directed to operating a differential mobility spectrometry (DMS) device and a tandem mass spectrometer in order to discriminate compounds or peptides with similar mass and minor differences in retention time behavior. More particularly, these systems and methods are directed to sequentially acquiring product ions of a wide mass range of precursor ions as the differential mobility of the precursor ions is sequentially increased.

In conventional SWATH-MS, each product ion spectrum is acquired sequentially with a sequential increase in the precursor ion mass selection window across the precursor ion mass range. Because each product ion spectrum is acquired sequentially with a sequential increase in differential mobility (DM) in the systems and methods described herein, this new type of acquisition can be referred to as DM-SWATH acquisition.

In DM-SWATH acquisition, orthogonal segregation of peptides is provided by adding a differential mobility dimension (DMS gas phase segregation) of peptide ions ahead of precursor selection. In this approach, the conventional SWATH dimension (single wide Q1 window, m/z 300-1200) is relaxed, but a dimension of DMS is added, which is orthogonal to both LC and MS. This DMS dimension is applied for capturing the MS/MS information, which is acquired over a range of CoV values (5 to 20, with step adjusted to instrument resolution) at elevated separation voltage (SV>3000 V, which represents reduced electric field (E/N) of ~100 Townsend (Td)). The MS information is, for example, acquired with the DMS device set to transmission mode (SV=CoV=0V). The overall duty cycle of the DMS dimension is faster than the SWATH dimension of conventional SWATH-MS while providing orthogonality to data (separation of isobaric peptides).

Figure 8:
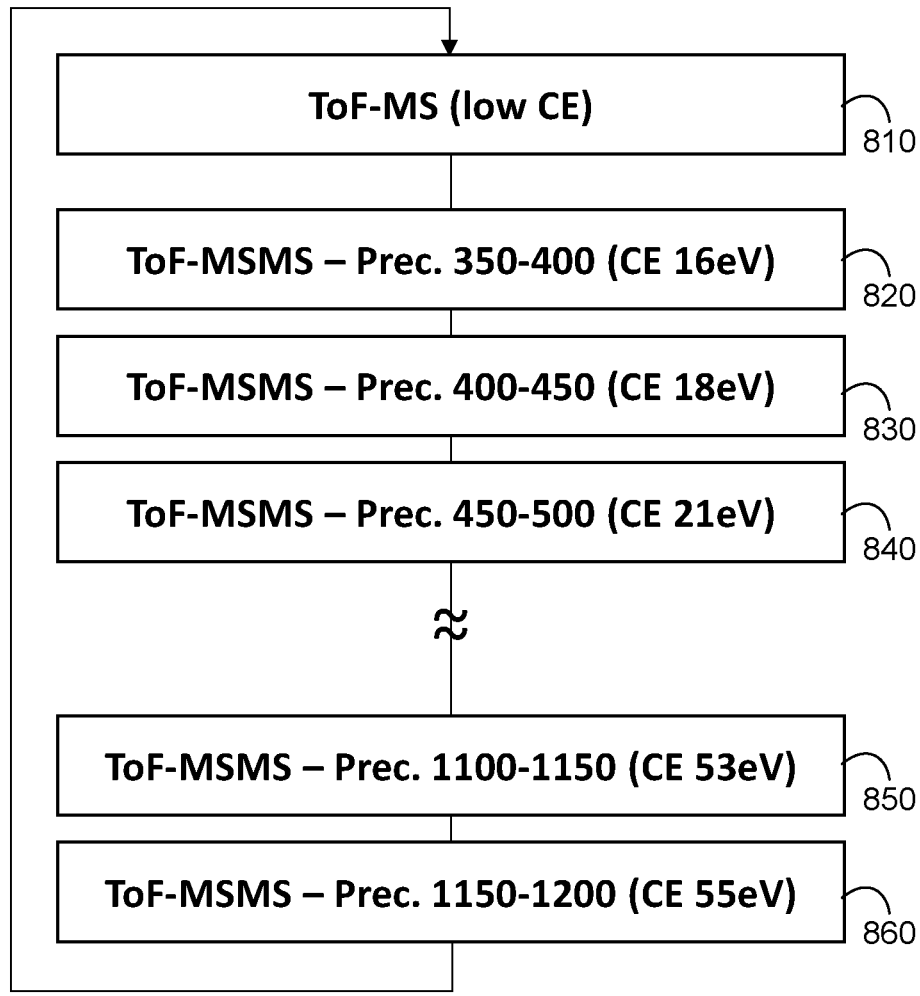
FIG. 8 is an exemplary flowchart showing the steps of a typical acquisition during each retention time cycle of a conventional SWATH LC-MS/MS experiment designed to validate identified peptides.

FIG. 8 is an exemplary flowchart 800 showing the steps of a typical acquisition during each retention time cycle of a conventional SWATH LC-MS/MS experiment designed to validate identified peptides.

In step 810, a low collision energy (CE) time-of-flight (TOF) mass spectrometry (MS) analysis is performed. Essentially, a precursor ion mass analysis is performed for the wide precursor ion mass range of 350 to 1200 m/z. From this precursor ion mass analysis, a precursor ion mass spectrum is produced. From all of the precursor ion mass spectra produced for the plurality of cycles of the liquid chromatography (LC) experiment, an extracted ion chromatogram (XIC) is calculated for each precursor ion found.

In step 820, a TOF mass spectrometry/mass spectrometry (MS/MS) analysis is performed with a CE of 16 eV for a narrow precursor mass range of 350 to 400 m/z. Essentially, precursor ions in the narrower 50 m/z precursor mass selection window from 350 to 400 m/z are selected and fragmented. The resulting product ions are then mass analyzed. From this product ion mass analysis, a product ion mass spectrum is produced.

In step 830, the 50 m/z precursor mass selection window is essentially moved or stepped to the precursor ion mass range from 400 to 450 m/z. Again, the precursor ions in this precursor ion mass range are selected and fragmented, the product ions are then mass analyzed, and a product ion mass spectrum is produced. For the fragmentation in this step, the CE is increase to 18 eV.

In step 840, the 50 m/z precursor mass selection window is again moved or stepped to the precursor ion mass range from 450 to 500 m/z. Also, again the precursor ions in this precursor ion mass range are selected and fragmented, the product ions are then mass analyzed, and a product ion mass spectrum is produced. For the fragmentation in this step, the CE is increased to 21 eV.

The process of stepping the narrower 50 m/z precursor mass selection window across the wide precursor mass range of 350 to 1200 m/z and increasing the CE continues for an additional 14 steps. The total number of steps is 17. The last two steps are shown as steps 850 and 860.

From each of the 17 steps in each cycle, a product ion spectrum is obtained. As a result, 17 product ion spectra are obtained for each cycle. From all of the product ion mass spectra produced for each narrower precursor ion mass range for the plurality of cycles of the LC experiment, an XIC is calculated for each product ion found.

Peptides represented by precursor ions are, for example, validated by finding their corresponding product ions. Corresponding product ions of the narrower 50 m/z precursor ion mass ranges are found by matching the retention times of their XIC peaks to the retention times of the XIC peaks of the precursor ions.

Figure 9:
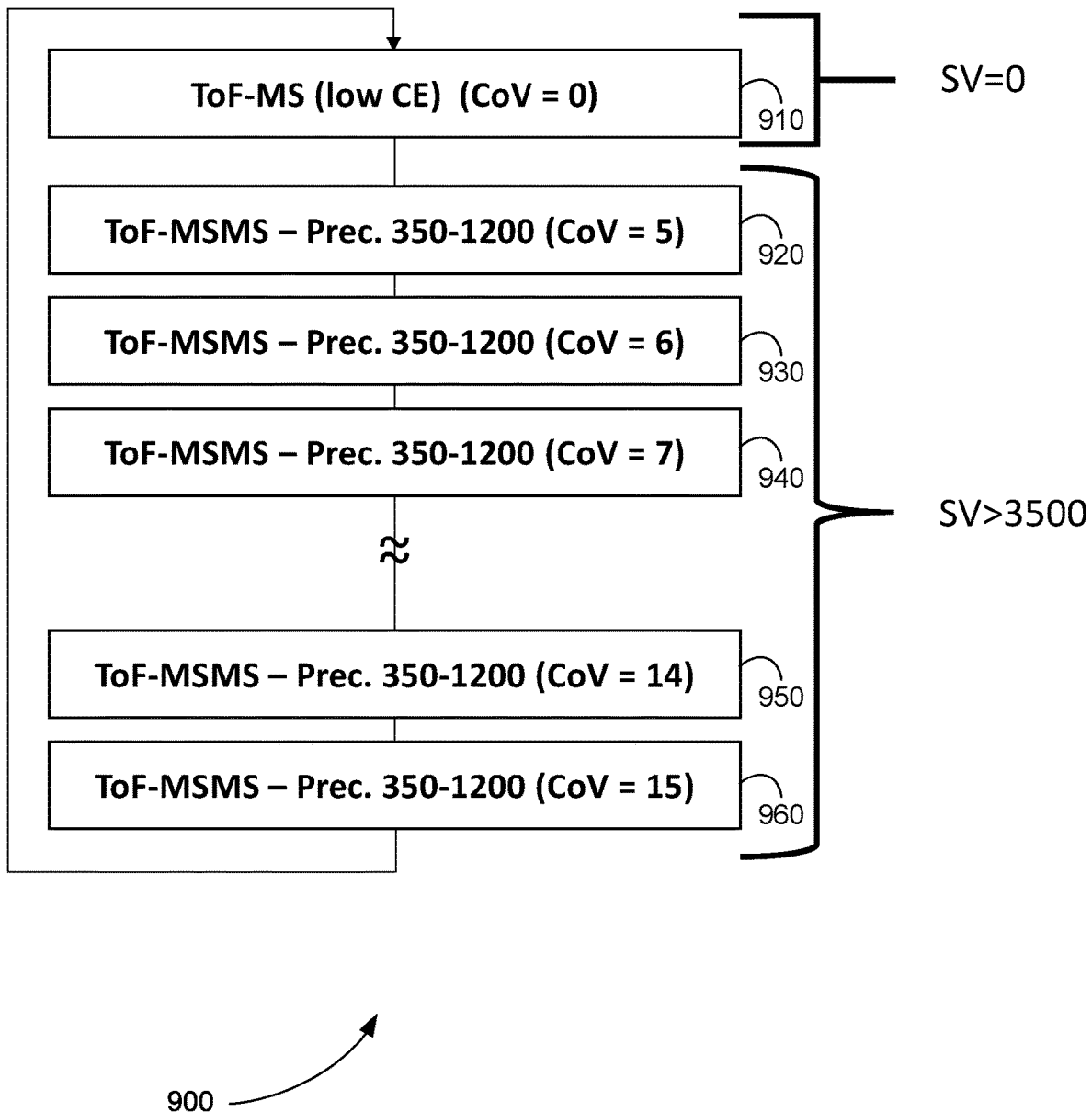
FIG. 9 is an exemplary flowchart showing the steps of an exemplary acquisition during each retention time cycle of a differential mobility (DM)-SWATH LC-MS/MS experiment designed to validate identified peptides, in accordance with various embodiments.

FIG. 9 is an exemplary flowchart 900 showing the steps of an exemplary acquisition during each retention time cycle of a DM-SWATH LC-MS/MS experiment designed to validate identified peptides, in accordance with various embodiments.

In step 910, a low collision energy (CE) time-of-flight (TOF) mass spectrometry (MS) analysis is performed as in conventional SWATH LC-MS/MS. The DMS device is switched off by setting the compensation voltage (CoV) and the RF separation voltage (SV) to zero. A precursor ion mass analysis is performed for the wide precursor ion mass range of 350 to 1200 m/z. From this precursor ion mass analysis, a precursor ion mass spectrum is produced. From all of the precursor ion mass spectra produced for the plurality of cycles of the liquid chromatography (LC) experiment, an XIC is calculated for each precursor ion found.

In step 920, the DMS device is turned on using a CoV of 5 V and an SV of 3000 V (or E/N~100 Td). For the precursor ions selected by the DMS device, a TOF-MS/MS analysis is performed for the entire wide precursor ion mass range of 350 to 1200 m/z. So, precursor ions selected by the DMS device and in the wide precursor ion mass range of 350 to 1200 m/z are selected and fragmented. The resulting product ions are then mass analyzed. From this product ion mass analysis a product ion mass spectrum is produced.

In step 930, the CoV of the DMS device is essentially stepped to a higher value of 6 V. The SV of the DMS device is kept constant at 3000 V (or E/N~100 Td). Again, for the precursor ions selected by the DMS device at this CoV, precursor ions are further selected from the wide precursor ion mass range of 350 to 1200 m/z and fragmented, the resulting product ions are mass analyzed, and a product ion mass spectrum is produced.

In step 940, the CoV of the DMS device is again stepped or increased to a higher value of 7 V. The SV of the DMS device is kept constant at 3000 V (or E/N~100 Td). Also, again for the precursor ions selected by the DMS device at this CoV, precursor ions are further selected from the wide precursor ion mass range of 350 to 1200 m/z and fragmented, the resulting product ions are mass analyzed, and a product ion mass spectrum is produced.

The process of stepping the CoV value of the DMS device continues for an additional 8 steps. The total number of steps is 11. The last two steps are shown as steps 950 and 960. The SV value of the DMS device, the precursor ion mass selection window of the tandem mass spectrometer, and the CE of the tandem mass spectrometer are all held constant for all 11 steps.

From each of the 11 steps in each cycle, a product ion spectrum is obtained. As a result, 11 product ion spectra are obtained for each cycle. From all of the product ion mass spectra produced for each CoV value of the DMS device for the plurality of cycles of the LC experiment, an XIC is calculated for each product ion found.

In FIG. 9, the CoV of the DMS device starts at a low value and is stepped or increased to a higher value in each step. In an alternative embodiment, the CoV of the DMS device starts at a high value and is stepped or decreased to a lower value in each step. In another alternative embodiment, a predetermined list CoV values for the DMS device may have varying levels of intensity. For example, the CoV values on the list may increase and decrease multiple times. In this case, the CoV of the DMS device starts at an initial value and is stepped or moved to the next value of the list in each step. In other words, the CoV values on the list do not necessarily have to uniformly increase or decrease but can vary randomly. Although the sequential variation in CoV values can vary randomly, the values used have to be known and repeatable.

As in conventional SWATH LC-MS/MS, peptides represented by precursor ions are, for example, validated by finding their corresponding product ions. Corresponding product ions of the narrower 50 m/z precursor ion mass ranges are found by matching the retention times of their XIC peaks to the retention times of the XIC peaks of the precursor ions.

DM-SWATH System

Figure 10:
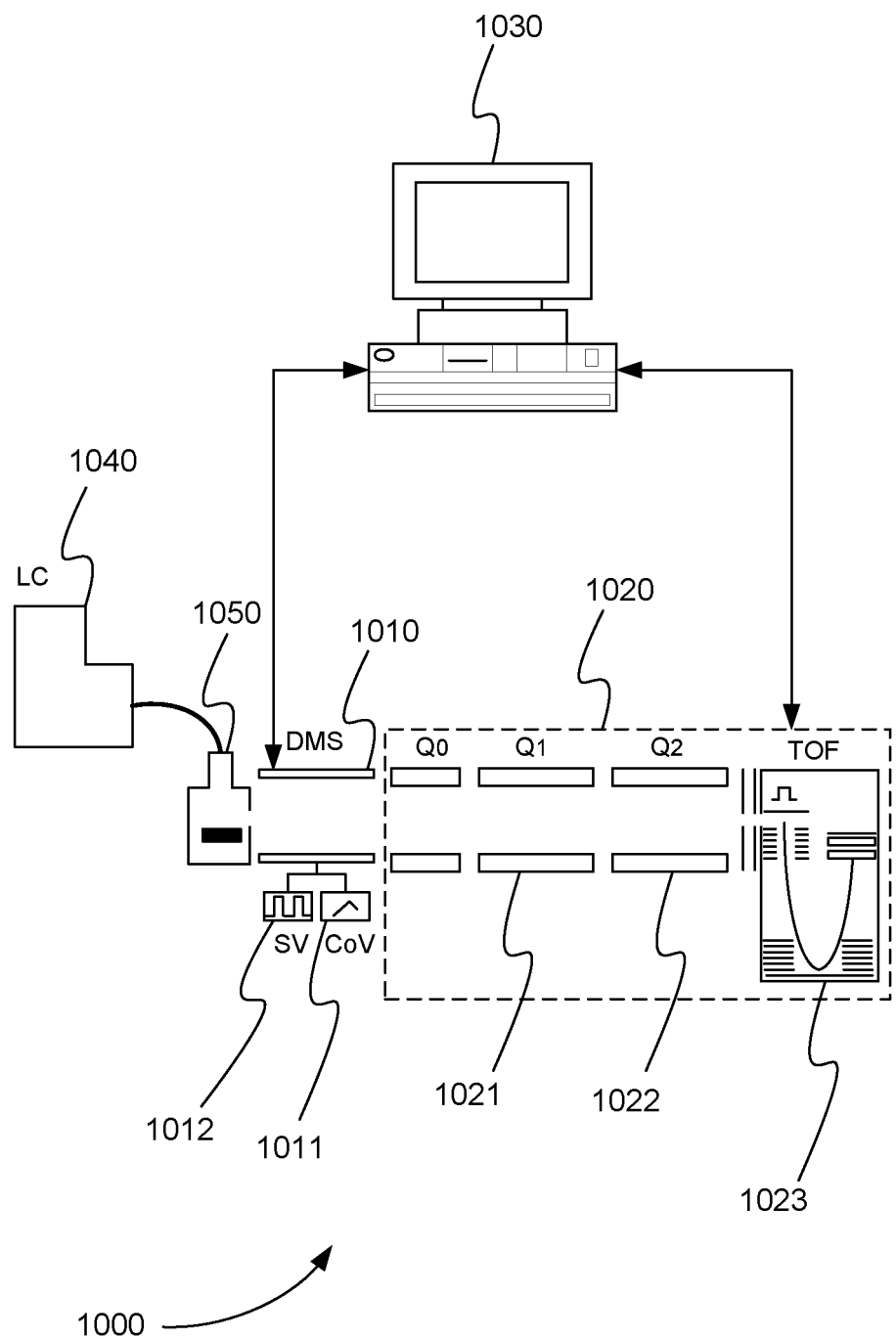
FIG. 10 is a schematic diagram of a system for controlling a DMS device and a tandem mass spectrometer to sequentially select separate groups of precursor ions with different differential mobilities and to mass filter, fragment, and mass analyze the resulting product ions of each group, in accordance with various embodiments.

FIG. 10 is a schematic diagram of a system 1000 for controlling a DMS device and a tandem mass spectrometer to sequentially select separate groups of precursor ions with different differential mobilities and to mass filter, fragment, and mass analyze the resulting product ions of each group, in accordance with various embodiments. System 1000 includes DMS device 1010, tandem mass spectrometer 1020, and processor 1030.

DMS device 1010 is configured to separate precursor ions based on a compensation voltage (CoV). An exemplary DMS device is the SelexION™ device produced by SCIEX.

Tandem mass spectrometer 1020 receives the separated precursor ions from DMS device 1010. Tandem mass spectrometer 1020 includes mass filter 1021 and fragmentation device 1022 to filter and fragment precursor ions and mass analyzer 1023 to mass analyze resulting product ions. Mass filter 1021 is shown as quadrupole. However, mass filter 1021 can be any type of mass filter. Fragmentation device 1022 is shown as quadrupole. However, fragmentation device 1022 can be any type of fragmentation device. Mass analyzer 1023 is shown as time-of-flight (TOF) analyzer. However, mass analyzer 1023 can be any type of mass analyzer. A mass analyzer of a tandem mass spectrometer can include, but is not limited to, for example a time-of-flight (TOF) device, a quadrupole, an ion trap, a linear ion trap, an orbitrap, a magnetic four-sector mass analyzer, a hybrid quadrupole time-of-flight (Q-TOF) mass analyzer, or a Fourier transform mass analyzer.

Processor 1030 is in communication with DMS device 1010 and tandem mass spectrometer 1020. Processor 1030 can be, but is not limited to, the system of FIG. 1, a computer, microprocessor, microcontroller, or any device capable of sending and receiving control signals and data to and from DMS device 1010 and tandem mass spectrometer 1020 and other devices.

Processor 1030 receives a plurality of compensation voltages (CoVs) for DMS device 1010 and a precursor ion mass range for mass filter 1021. The plurality of CoVs and the precursor ion mass range may be received from a user through a user interface (not shown) or from a memory (not shown). The plurality of CoVs and the precursor ion mass range may be defined as part of a standard acquisition method or as part of a customized experiment.

In a preferred embodiment, the plurality of CoVs are a plurality of increasing CoVs. In an alternative embodiment, the plurality of CoVs are a plurality of decreasing CoVs. In another alternative embodiment, the plurality of CoVs are a plurality of randomly varying CoVs.

For each CoV of the plurality of CoVs, processor 1030 performs a number of steps. In a first step, processor 1030 applies the CoV to DMS device 1010 to select a group of precursor ions. Processor 1030 applies the CoV to DMS device 1010 by controlling CoV voltage supply 1011, for example.

Figure 11:
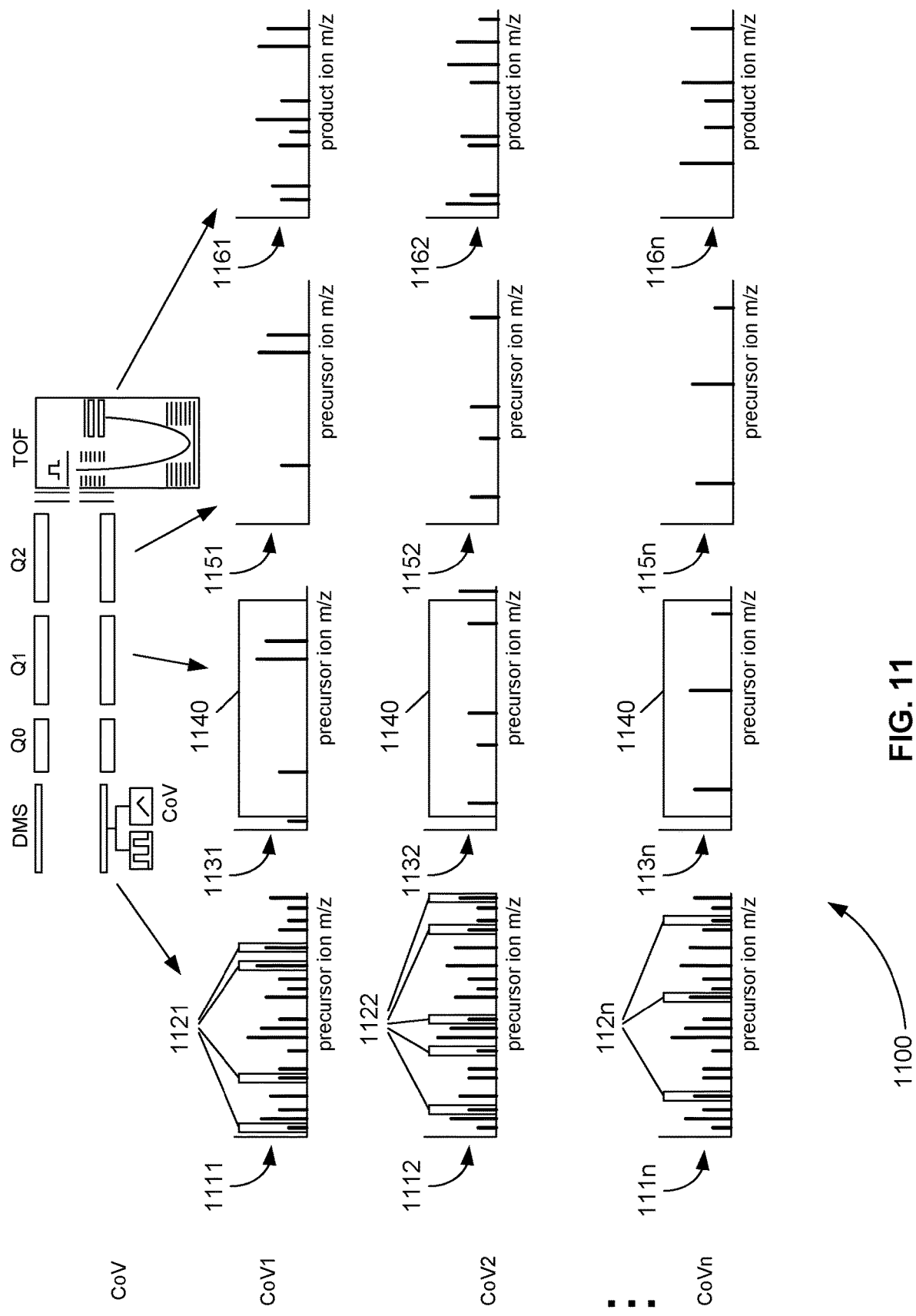
FIG. 11 is an exemplary diagram showing how the DMS device of FIG. 10 separates groups of precursor ions with different differential mobilities and the tandem mass spectrometer of FIG. 10 mass filters, fragments, and mass analyzes the resulting product ions of each group, in accordance with various embodiments.

FIG. 11 is an exemplary diagram 1100 showing how DMS device 1010 of FIG. 10 separates groups of precursor ions with different differential mobilities and tandem mass spectrometer 1020 of FIG. 10 mass filters, fragments, and mass analyzes the resulting product ions of each group, in accordance with various embodiments.

Plots 1111, 1112, and 111$n$ show how DMS device 1010 of FIG. 10 selects groups of precursor ions for each of the plurality of CoVs $CoV_1$, $CoV_2$, and $CoV_n$. For example, precursor ions 1121 are selected for $CoV_1$, precursor ions 1122 are selected for $CoV_2$, and precursor ions 112$n$ are selected for $CoV_n$. Note that the selection of precursor ions 1121, 1122, and 112$n$ is not correlated to m/z. Note also that plots 1111, 1112, and 111$n$ are only for illustrative purposes and groups of precursor ions selected by DMS device 1010 of FIG. 10 are not mass analyzed and are not selected using mass windows.

Returning to FIG. 10, processor 1030 instructs mass filter 1021 to select precursor ions of the group that are within the precursor ion mass range, producing a subgroup of precursor ions. Plots 1131, 1132, and 113$n$ of FIG. 11 show how mass filter 1021 of FIG. 10 selects precursor ions of the group that are within the precursor ion mass range. For example, precursor ion mass selection window 1140 selects precursor ions of the group that are within the same precursor ion mass range. Again, note that plots 1131, 1132, and 113$n$ are only for illustrative purposes and precursor ions of the group that are within the same precursor ion mass range are not mass analyzed.

Returning to FIG. 10, processor 1030 instructs fragmentation device 1022 to fragment the subgroup of precursor ions, producing a group of product ions. Plots 1151, 1152, and 115$n$ of FIG. 11 show the subgroups of precursor ions fragmented by fragmentation device 1022 of FIG. 10. Again, note that plots 1151, 1152, and 115*n* are only for illustrative purposes and the subgroups of precursor ions fragmented are not mass analyzed.

Returning to FIG. 10, processor 1030 instructs mass analyzer 1023 to measure the intensity and m/z of the group of product ions, producing a product ion spectrum for each CoV of the plurality of CoVs. Plots 1161, 1162, and 116*n* of FIG. 11 show a product ion spectrum for each CoV of the plurality of CoVs measured by mass analyzer 1023 of FIG. 10.

Returning to FIG. 10, processor 1030 instructs mass filter 1021, fragmentation device 1022, and mass analyzer 1023 by, for example, applying one or more voltages to these devices using one or more voltage supplies (not shown).

DMS device 1010, for example, can also be configured to separate precursor ions based on an RF SV received by processor 1030. Processor 1030 applies the same SV to the DMS device for each CoV of the plurality of CoVs. Processor 1030 applies the SV to DMS device 1010 by controlling SV voltage supply 1012, for example. In various embodiments, the SV received is greater than 3000 V (or E/N greater than 100 Td).

In various embodiments, system 1000 of FIG. 10 is further used to validate if a known compound is in a sample. System 1000 further includes sample separation device 1040 and ion source 1050. Sample separation device 1040 uses a technique that includes, but is not limited to, liquid chromatography, gas chromatography, capillary electrophoresis, or ion mobility. Ion source 1050 uses a technique that includes, but is not limited to, electrospray ionization (ESI) (e.g., nanospray) or matrix-assisted laser desorption/ionization (MALDI).

Sample separation device 1040 separates one or more compounds from a sample over time. Ion source 1050 ionizes the separated one or more compounds and transmits the ionized precursor ions to DMS device 1010 as an ion beam.

Processor 1030 instructs DMS device 1010 to sample the ion beam in a series of time cycles. For each cycle of the series, processor 1030 performs a number of steps. In a first step, processor 1030 instructs DMS device 1010 and tandem mass spectrometer 1020 to perform a precursor survey scan without differential mobility selection. This is performed by applying a CoV of zero to DMS device 1010, instructing mass filter 1021 to select precursor ions of the ion beam that are within the precursor ion mass range, producing a group of filtered precursor ions, instructing fragmentation device 1022 to transmit the group of filtered precursor ions without fragmentation to mass analyzer 1023, and instructing mass analyzer 1023 to measure the intensity and m/z of the group of the filtered precursor ions, producing a precursor ion spectrum.

In a second step, processor 1030 instructs DMS device 1010 and tandem mass spectrometer 1020 to perform sequential differential mobility dependent product ion scans on the ion beam for each CoV of the plurality of CoVs as described above.

Processor 1030 validates the presence of a compound of the one or more compounds in the sample using the precursor ion spectra and the product ion spectra measured over the series of time cycles. Specifically, processor 1030 calculates a precursor ion XIC for a precursor ion known to correspond to the compound from the precursor ion spectra acquired over the series of time cycles. Processor 1030 calculates one or more product ion XICs for one or more product ions known to correspond to the compound from the product ion spectra acquired for each CoV over the series of time cycles.

Processor 1030 validates the presence of the compound if a retention time of an XIC peak of the precursor ion XIC matches a retention time of an XIC peak of the one or more product ion XICs.

As described above, DMS device 1010, for example, can also be configured to separate precursor ions based on an SV received by processor 1030. As a result, processor 1030 instructs DMS device 1010 and tandem mass spectrometer 1020 to perform a precursor survey scan without differential mobility selection by also applying an SV of zero to DMS device 1010.

In various embodiments, the one or more compounds can be one or more peptides.

DM-SWATH Method

Figure 12:
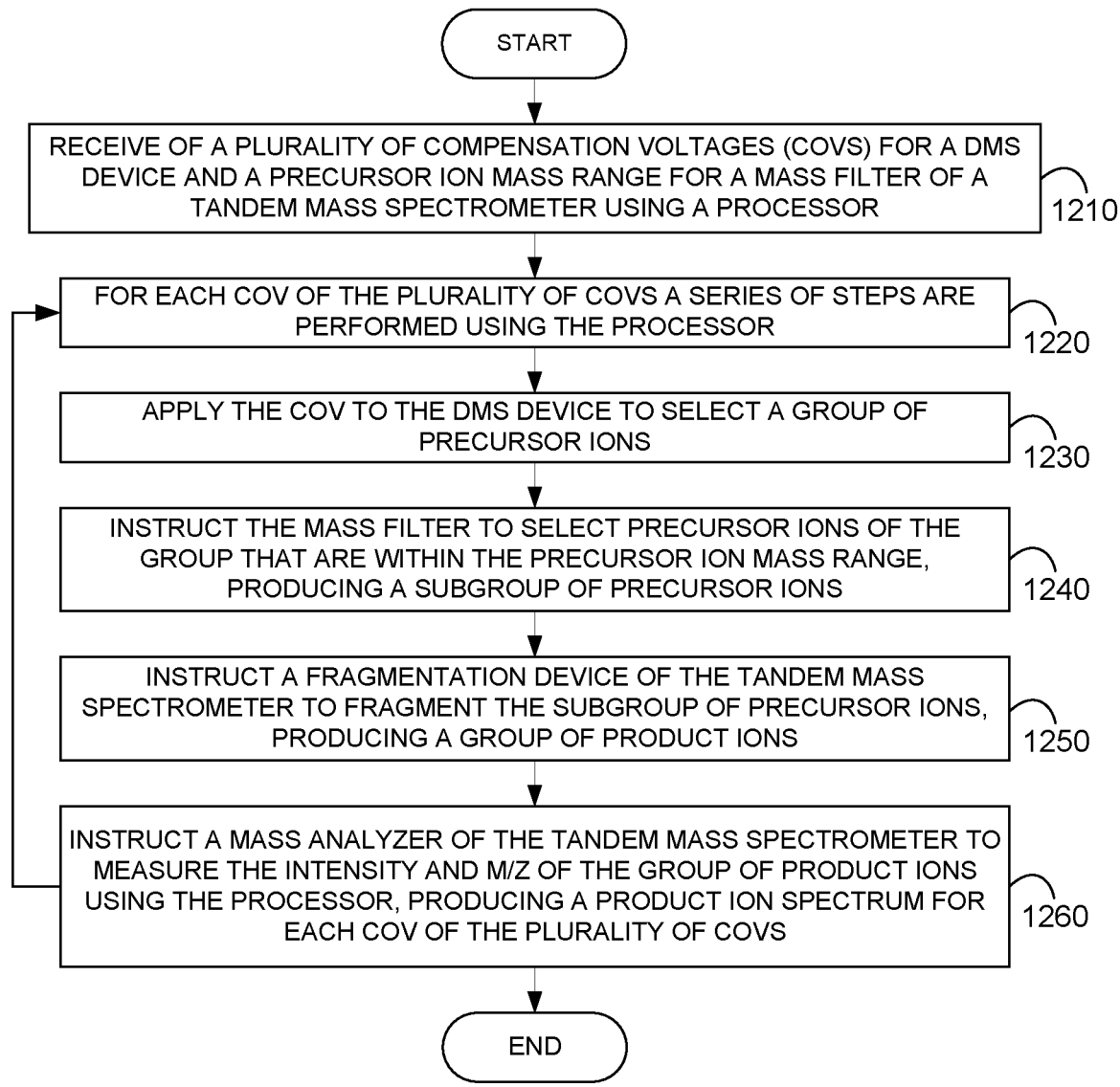
FIG. 12 is a flowchart showing a method for controlling a DMS device and a tandem mass spectrometer to sequentially select separate groups of precursor ions with different differential mobilities and to mass filter, fragment, and mass analyze the resulting product ions of each group, in accordance with various embodiments.

FIG. 12 is a flowchart showing a method 1200 for controlling a DMS device and a tandem mass spectrometer to sequentially select separate groups of precursor ions with different differential mobilities and to mass filter, fragment, and mass analyze the resulting product ions of each group, in accordance with various embodiments.

In step 1210 a plurality of CoVs for a DMS device is received and a precursor ion mass range for a mass filter of a tandem mass spectrometer is received using a processor. The DMS device is configured to separate precursor ions based on a CoV. The tandem mass spectrometer receives the separated precursor ions from the DMS device and includes the mass filter and a fragmentation device to filter and fragment precursor ions and a mass analyzer to mass analyze resulting product ions.

In step 1220 an iterative series of steps are performed for each CoV of the plurality of CoVs using the processor.

In step 1230, the CoV is applied to the DMS device to select a group of precursor ions.

In step 1240, the mass filter is instructed to select precursor ions of the group that are within the precursor ion mass range, producing a subgroup of precursor ions.

In step 1250, the fragmentation device is instructed to fragment the subgroup of precursor ions, producing a group of product ions.

In step 1260, the mass analyzer is instructed to measure the intensity and m/z of the group of product ions using the processor, producing a product ion spectrum for each CoV of the plurality of CoVs.

DM-SWATH Computer Program Product

In various embodiments, computer program products include a tangible computer-readable storage medium whose contents include a program with instructions being executed on a processor so as to perform a method for controlling a DMS device and a tandem mass spectrometer to sequentially select separate groups of precursor ions with different differential mobilities and to mass filter, fragment, and mass analyze the resulting product ions of each group. This method is performed by a system that includes one or more distinct software modules.

Figure 13:
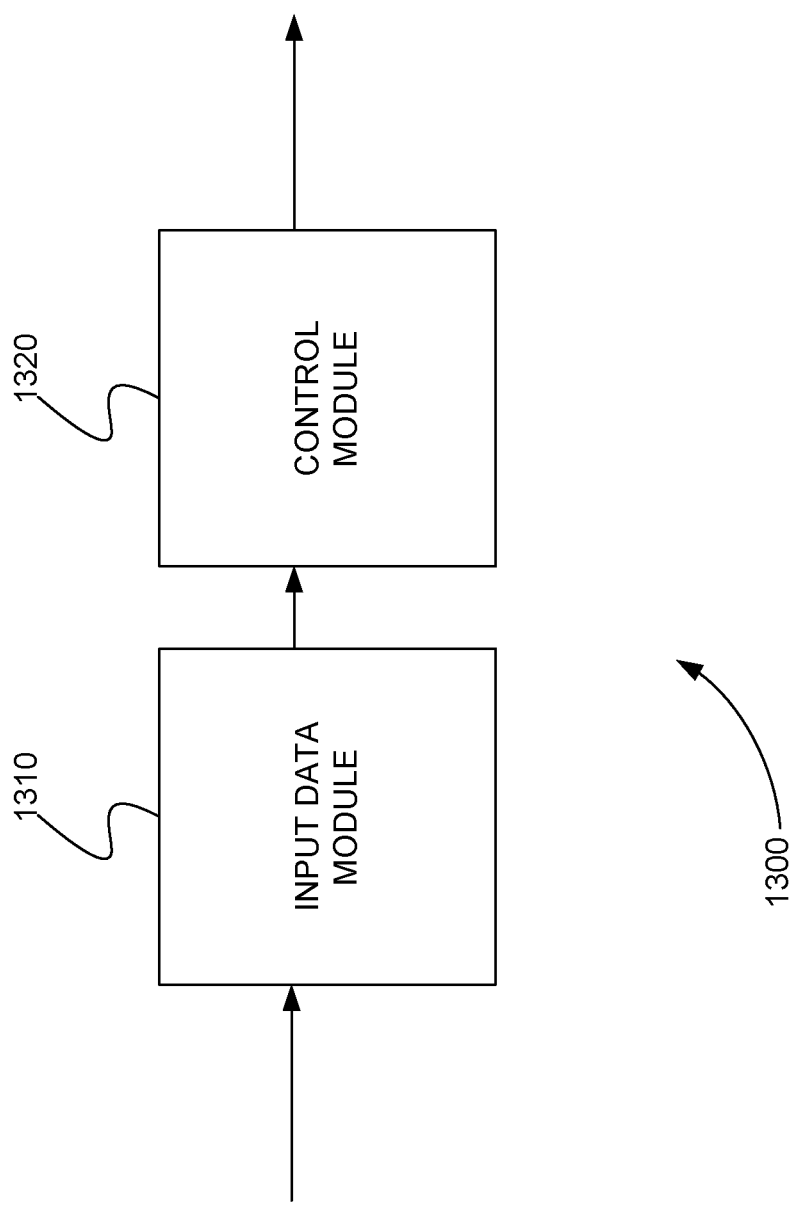
FIG. 13 is a schematic diagram of a system that includes one or more distinct software modules that performs a method for controlling a DMS device and a tandem mass spectrometer to sequentially select separate groups of precursor ions with different differential mobilities and to mass filter, fragment, and mass analyze the resulting product ions of each group, in accordance with various embodiments.

FIG. 13 is a schematic diagram of a system 1300 that includes one or more distinct software modules that performs a method for controlling a DMS device and a tandem mass spectrometer to sequentially select separate groups of precursor ions with different differential mobilities and to mass filter, fragment, and mass analyze the resulting product ions of each group, in accordance with various embodiments. System 1300 includes input data module 1310 and control module 1320.

Input data module 1310 receives a plurality of CoVs for a DMS device and a precursor ion mass range for a mass filter of a tandem mass spectrometer. The DMS device is configured to separate precursor ions based on a CoV. The tandem mass spectrometer receives the separated precursor ions from the DMS device and includes the mass filter and a fragmentation device to filter and fragment precursor ions and a mass analyzer to mass analyze resulting product ions.

Control module 1320 performs an iterative series of steps for each CoV of the plurality of CoVs using. Each CoV is applied to the DMS device to select a group of precursor ions. The mass filter is instructed to select precursor ions of the group that are within the precursor ion mass range, producing a subgroup of precursor ions. The fragmentation device is instructed to fragment the subgroup of precursor ions, producing a group of product ions. The mass analyzer is instructed to measure the intensity and mass-to-charge ratio (m/z) of the group of product ions using the control module, producing a product ion spectrum for each CoV of the plurality of CoVs.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for controlling a differential mobility spectrometry (DMS) device and a tandem mass spectrometer to sequentially select separate groups of precursor ions with different differential mobilities and to mass filter, fragment, and mass analyze the resulting product ions of each group, comprising:
   a DMS device configured to separate precursor ions based on a compensation voltage (CoV);
   a tandem mass spectrometer that receives the separated precursor ions from the DMS device and includes a mass filter and fragmentation device to filter and fragment precursor ions in a data-independent acquition (DIA) method and a mass analyzer to mass analyze resulting product ions in the DIA method; and
   a processor in communication with the DMS device and the tandem mass spectrometer that
      (a) receives a plurality of CoVs for the DMS device and a precursor ion mass range for the mass filter and
      (b) in the DIA method, for each CoV of the plurality of CoVs,
         applies the each CoV to the DMS device to select a group of precursor ions,
         instructs the mass filter to select precursor ions of the group that are within the precursor ion mass range, producing a subgroup of precursor ions,
         instructs the fragmentation device to fragment the subgroup of precursor ions using a non-specific fragmentation method, producing a group of product ions, and
         instructs the mass analyzer to measure the intensity and mass-to-charge ratio (m/z) of the group of product ions, producing a product ion spectrum for each CoV of the plurality of CoVs.

2. The system of claim 1, wherein the DMS device is also configured to separate precursor ions based on an RF separation voltage (SV), in step (a) the processor also receives an SV for the DMS device, and in step (b) the processor also applies the SV to the DMS device.

3. The system of claim 2, wherein the SV is greater than 3000 V.

4. The system of claim 2, wherein the reduced electric field (E/N) is greater than 100 Td.

5. The system of claim 1 further comprising
   a sample separation device that separates one or more compounds from a sample over time and
   an ion source that ionizes the separated one or more compounds and transmits the ionized precursor ions to the DMS device as an ion beam,
   wherein the processor instructs the DMS device to sample the ion beam in a series of time cycles and
      for each cycle of the series,
         instructs the DMS device and tandem mass spectrometer to perform a precursor survey scan without differential mobility selection by applying a CoV of zero to the DMS device, instructing the mass filter to select precursor ions of the ion beam that are within the precursor ion mass range, producing a group of filtered precursor ions, instructing the fragmentation device to transmit the group of filtered precursor ions without fragmentation to the mass analyzer, and instructing the mass analyzer to measure the intensity and m/z of the group of the filtered precursor ions, producing a precursor ion spectrum and
         instructs the DMS device and tandem mass spectrometer to perform sequential differential mobility dependent product ion scans on the ion beam by performing step (b), and
      validates the presence of a compound of the one or more compounds in the sample by
         calculating a precursor ion extract ion chromatogram (XIC) for a precursor ion known to correspond to the compound from the precursor ion spectra acquired over the series of time cycles,
         calculating one or more product ion XICs for one or more product ions known to correspond to the compound from the product ion spectra acquired for each CoV over the series of time cycles, and
         validating the presence of the compound if a retention time of an XIC peak of the precursor ion XIC matches a retention time of an XIC peak of the one or more product ion XICs.

6. The system of claim 5, wherein the DMS device is also configured to separate precursor ions based on an RF separation voltage (SV), in step (a) the processor also receives an SV for the DMS device, in step (b) the processor also applies the SV to the DMS device, and the processor instructs the DMS device and tandem mass spectrometer to perform a precursor survey scan without differential mobility selection by also applying an SV of zero to the DMS device.

7. The system of claim 6, wherein the SV is greater than 3000 V.

8. The system of claim 6, wherein the reduced electric field (E/N) is greater than 100 Td.

9. The system of claim 1, wherein the mass analyzer comprises a time-of-flight (TOF) mass analyzer.

10. The system of claim 5, wherein the one or more compounds comprise one or more peptides.

11. A method for controlling a differential mobility spectrometry (DMS) device and a tandem mass spectrometer to sequentially select separate groups of precursor ions with different differential mobilities and to mass filter, fragment, and mass analyze the resulting product ions of each group, comprising:
   (a) receiving a plurality of compensation voltages (CoVs) for a DMS device and a precursor ion mass range for a mass filter of a tandem mass spectrometer using a processor, wherein the DMS device is configured to separate precursor ions based on a CoV and the tandem mass spectrometer receives the separated precursor ions from the DMS device and includes the mass filter and a fragmentation device to filter and fragment precursor ions in a data-independent acquition (DIA) method and a mass analyzer to mass analyze resulting product ions in the DIA method and
   (b) in the DIA method, for each CoV of the plurality of CoVs,
      applying the each CoV to the DMS device to select a group of precursor ions,
      instructing the mass filter to select precursor ions of the group that are within the precursor ion mass range, producing a subgroup of precursor ions,
      instructing the fragmentation device to fragment the subgroup of precursor ions using a non-specific fragmentation method, producing a group of product ions, and
      instructing the mass analyzer to measure the intensity and mass-to-charge ratio (m/z) of the group of product ions using the processor, producing a product ion spectrum for each CoV of the plurality of CoVs.

12. The method of claim 11, wherein the DMS device is also configured to separate precursor ions based on an RF separation voltage (SV), in step (a) an SV is also received for the DMS device, and in step (b) the SV is also applied to the DMS device.

13. The method of claim 11, further comprising
   instructing the DMS device to sample an ion beam in a series of time cycles using the processor, wherein a sample separation device separates one or more compounds from a sample over time and an ion source ionizes the separated one or more compounds and transmits the ionized precursor ions to the DMS device as the ion beam, and
   for each cycle of the series,
      instructing the DMS device and tandem mass spectrometer to perform a precursor survey scan without differential mobility selection using the processor by applying a CoV of zero to the DMS device, instructing the mass filter to select precursor ions of the ion beam that are within the precursor ion mass range, producing a group of filtered precursor ions, instructing the fragmentation device to transmit the group of filtered precursor ions without fragmentation to the mass analyzer, and instructing the mass analyzer to measure the intensity and m/z of the group of the filtered precursor ions, producing a precursor ion spectrum and
      instructing the DMS device and tandem mass spectrometer to perform sequential differential mobility dependent product ion scans on an ion beam using the processor by performing step (b), and
      validating the presence of a compound of the one or more compounds in the sample using the processor by
         calculating a precursor ion extract ion chromatogram (XIC) for a precursor ion known to correspond to the compound from the precursor ion spectra acquired over the series of time cycles,
         calculating one or more product ion XICs for one or more product ions known to correspond to the compound from the product ion spectra acquired for each CoV over the series of time cycles, and
         validating the presence of the compound if a retention time of an XIC peak of the precursor ion XIC matches a retention time of an XIC peak of the one or more product ion XICs.

14. The method of claim 11, wherein the DMS device is also configured to separate precursor ions based on an RF separation voltage (SV), in step (a) an SV is also received for the DMS device, in step (b) the SV is also applied to the DMS device, and instructing the DMS device and tandem mass spectrometer to perform a precursor survey scan without differential mobility selection by also applying an SV of zero to the DMS device.

15. A computer program product, comprising a non-transitory and tangible computer-readable storage medium whose contents include a program with instructions being executed on a processor so as to perform a method for controlling a differential mobility spectrometry (DMS) device and a tandem mass spectrometer to sequentially select separate groups of precursor ions with different differential mobilities and to mass filter, fragment, and mass analyze the resulting product ions of each group, the method comprising:
   providing a system, wherein the system comprises one or more distinct software modules, and wherein the distinct software modules comprise a data input module and a control module;
      (a) receiving a plurality of compensation voltages (CoVs) for a DMS device and a precursor ion mass range for a mass filter of a tandem mass spectrometer using data input module, wherein the DMS device is configured to separate precursor ions based on a CoV and the tandem mass spectrometer receives the separated precursor ions from the DMS device and includes the mass filter and a fragmentation device to filter and fragment precursor ions in a data-independent acquition (DIA) method and a mass analyzer to mass analyze resulting product ions in the DIA method and
      (b) in the DIA method, for each CoV of the plurality of CoVs,
         applying the each CoV to the DMS device to select a group of precursor ions,
         instructing the mass filter to select precursor ions of the group that are within the precursor ion mass range, producing a subgroup of precursor ions,
         instructing the fragmentation device to fragment the subgroup of precursor ions using a non-specific fragmentation method, producing a group of product ions, and
         instructing the mass analyzer to measure the intensity and mass-to-charge ratio (m/z) of the group of product ions using the control module, producing a product ion spectrum for each CoV of the plurality of CoVs.

* * * * *